(12) United States Patent
Focke et al.

(10) Patent No.: US 7,669,387 B2
(45) Date of Patent: Mar. 2, 2010

(54) PACKAGE PARTICULARLY A CIGARETTE PACKAGE, AND METHOD AND DEVICE FOR THE PRODUCTION THEREOF

(75) Inventors: Heinz Focke, Verden (DE); Jurgen Focke, legal representative, Verden (DE); Doris Focke, legal representative, Verden (DE); Tobias Jacobi, Hamburg (DE); Gisbert Engel, Luttum (DE)

(73) Assignee: Focke & Co. (GmbH & Co. KG), Verden (DE)

( * ) Notice: Subject to any disclaimer, the term of this patent is extended or adjusted under 35 U.S.C. 154(b) by 0 days.

(21) Appl. No.: 10/488,186

(22) PCT Filed: Sep. 12, 2002

(86) PCT No.: PCT/EP02/10239

§ 371 (c)(1),
(2), (4) Date: Aug. 5, 2004

(87) PCT Pub. No.: WO03/025833

PCT Pub. Date: Mar. 27, 2003

(65) Prior Publication Data

US 2005/0022470 A1 Feb. 3, 2005

(30) Foreign Application Priority Data

Sep. 14, 2001 (DE) ............... 101 45 413

(51) Int. Cl.
*B65B 49/12* (2006.01)
(52) U.S. Cl. ............. 53/234; 53/52; 53/228; 53/232; 53/148
(58) Field of Classification Search ............ 53/52, 53/493, 376.3, 77, 444, 148, 228, 232, 234
See application file for complete search history.

(56) References Cited

U.S. PATENT DOCUMENTS

| 4,643,027 | A | * | 2/1987 | Deutsch et al. | ............ 73/865.8 |
| 4,666,536 | A | * | 5/1987 | Van Erden et al. | ............ 156/64 |
| 4,708,704 | A | | 11/1987 | Focke et al. | |
| 4,742,470 | A | | 5/1988 | Juengel | |
| 4,802,027 | A | | 1/1989 | Brooks et al. | |
| 5,101,609 | A | * | 4/1992 | Cook | ............ 53/53 |
| 5,190,428 | A | * | 3/1993 | Bryant et al. | ............ 414/403 |
| 5,478,184 | A | * | 12/1995 | Bryant et al. | ............ 414/416.05 |
| 5,653,086 | A | * | 8/1997 | Spada et al. | ............ 53/148 |
| 5,678,385 | A | * | 10/1997 | Focke et al. | ............ 53/148 |
| 5,877,506 | A | * | 3/1999 | Focke et al. | ............ 250/559.2 |
| 5,946,885 | A | * | 9/1999 | Focke et al. | ............ 53/234 |

(Continued)

FOREIGN PATENT DOCUMENTS

CN 1004425 B 6/1986

(Continued)

*Primary Examiner*—Christopher Harmon
(74) *Attorney, Agent, or Firm*—Sughrue Mion, PLLC

(57) ABSTRACT

Transponders are used for identifying objects such as packaging, packaging material or machines and machine elements and are attached to the object to be identified. The transponders contain data which are provided by an electronic write unit and which can be recognized by a read unit. The transponders are provided in a concealed manner on the machines, machine parts, etc. or are embedded in the machine part, for example, inside a recess.

6 Claims, 7 Drawing Sheets

U.S. PATENT DOCUMENTS

| | | | | |
|---|---|---|---|---|
| 6,047,579 | A * | 4/2000 | Schmitz | 72/15.1 |
| 6,199,701 | B1 * | 3/2001 | Bodini | 206/723 |
| 6,280,372 | B1 * | 8/2001 | Focke et al. | 493/8 |
| 6,318,051 | B1 * | 11/2001 | Preiss | 53/493 |
| 6,550,220 | B1 * | 4/2003 | Focke et al. | 53/396 |
| 6,585,628 | B1 * | 7/2003 | Tsung et al. | 483/9 |
| 6,629,397 | B1 * | 10/2003 | Focke et al. | 53/55 |
| 6,722,109 | B1 * | 4/2004 | Focke et al. | 53/575 |
| 6,973,713 | B1 * | 12/2005 | Huber et al. | 29/740 |

FOREIGN PATENT DOCUMENTS

| | | |
|---|---|---|
| DE | 37 06 114 | 8/1987 |
| DE | 39 04 001 A1 | 8/1989 |
| DE | 196 47 670 | 5/1998 |
| DE | 198 40 785 A1 | 3/2000 |
| DE | 199 00 086 A1 | 7/2000 |
| DE | 199 08 878 | 9/2000 |
| DE | 199 54 750 | 5/2001 |
| DE | 199 55 685 A1 | 5/2001 |
| EP | 762 535 | 3/1997 |
| EP | 967161 A1 | 6/1999 |
| JP | 62-181857 A | 8/1987 |
| JP | 10-287315 A | 10/1998 |
| JP | 2001-219480 A | 8/2001 |
| JP | 2003-67704 A | 3/2003 |
| WO | WO 00 46734 | 8/2000 |
| WO | 01/53171 A1 | 7/2001 |
| WO | WO 01/60696 A1 | 8/2001 |
| WO | WO 01/61646 A1 | 8/2001 |
| WO | WO 01 80139 | 10/2001 |

\* cited by examiner

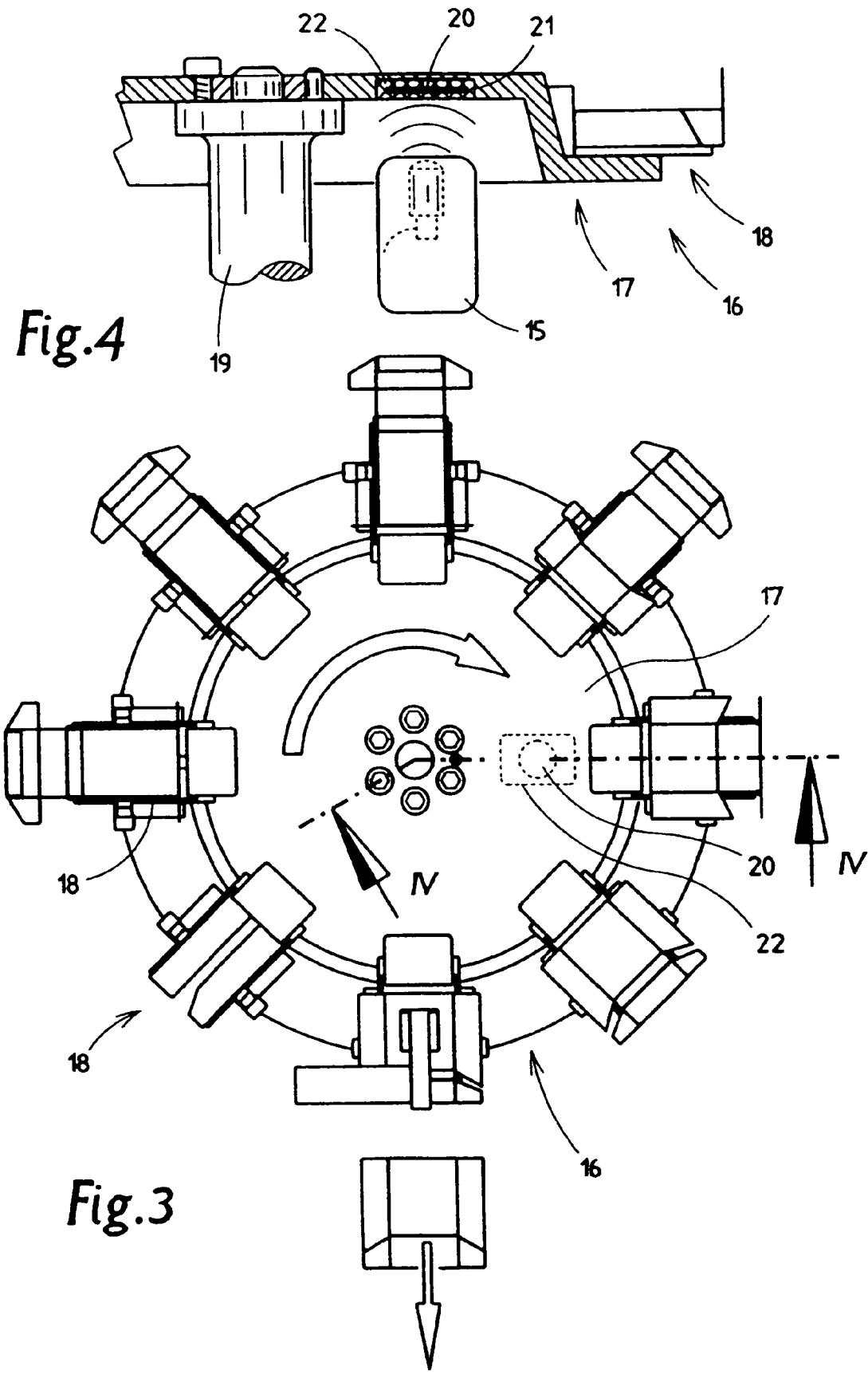

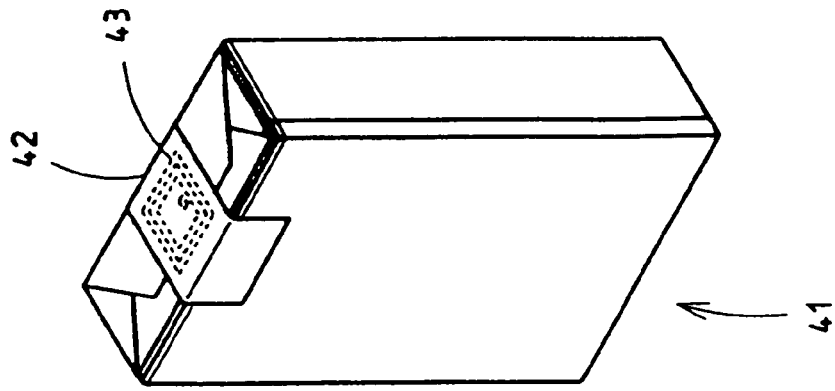
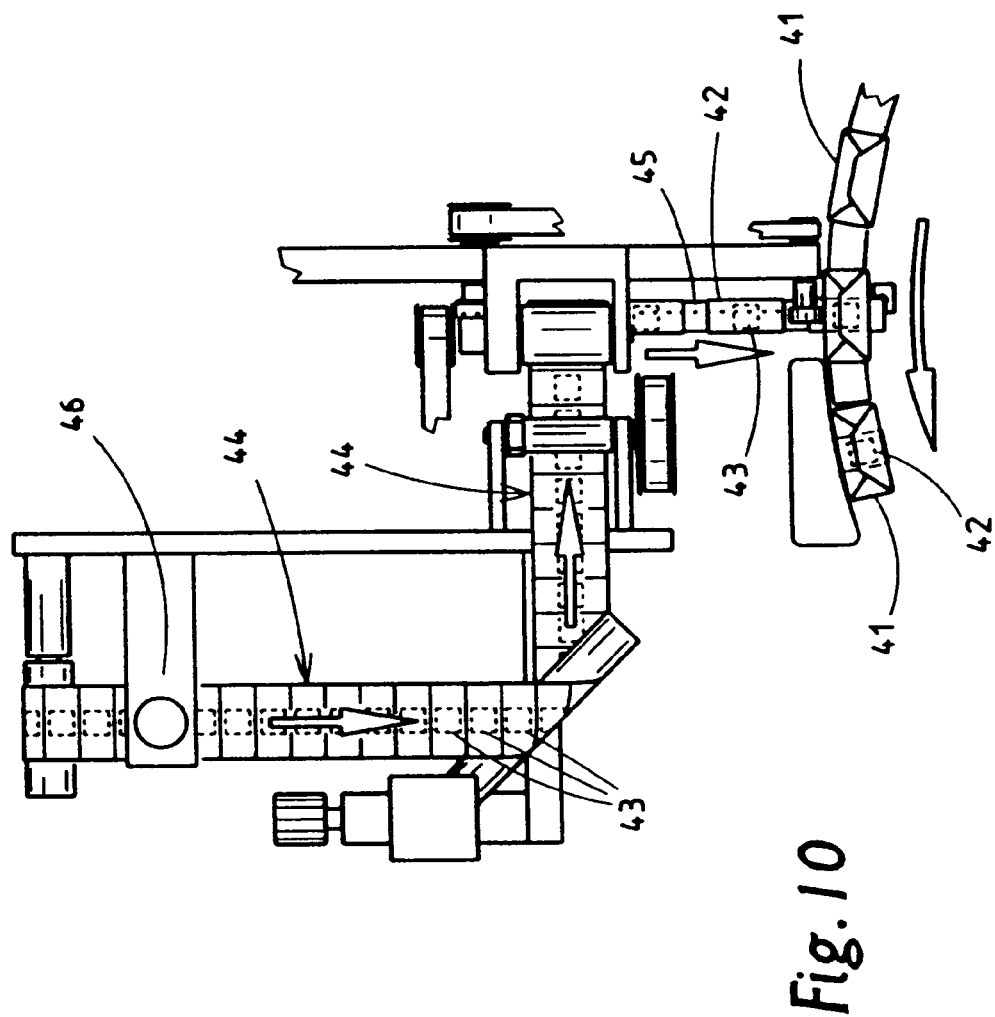

US 7,669,387 B2

PACKAGE PARTICULARLY A CIGARETTE PACKAGE, AND METHOD AND DEVICE FOR THE PRODUCTION THEREOF

BACKGROUND OF THE INVENTION

The invention relates to a process for identifying objects, in particular packages, packaging material, machines, machine parts, machine assemblies, etc. Furthermore the invention relates to packages, packaging material, machines, machine assemblies and the like having data carriers for identification purposes.

The identification of materials, or of machines and machine parts, is known in principle. In the case of packages and packaging materials, in particular cigarette packs, it is important that data concerning pack production or the pack's contents be present on the pack in codified form. In the case of machine parts, machine assemblies and in particular replacement parts, identification serves to ensure a correct assignment of machine parts for a particular format.

SUMMARY OF THE INVENTION

The invention relates in the broadest meaning to the electronic identification of objects, in particular with the help of radiofrequency technology for identification purposes. To this end, so-called transponders are employed.

The object of the invention is to propose measures for identifying objects with the help of transponders for the purpose of recording retrievable information.

To achieve this object, the method according to the invention is characterized by the following features:
a) at least one data carrier operating on the basis of radiofrequency technology, in particular a transponder, is attached to the object,
b) the data carrier is provided by means of an electronic write unit with the data or information relating to the object,
c) in order to identify the object and to record the data or information of the data carrier, the object or the data carrier is fed to an electronic read unit.

The identification according to the invention is of particular interest to the cigarette industry. According to the invention, cigarette packs, in particular cigarette bundle packs—so-called cigarette cartons—are provided with a transponder which is attached to the packaging material, namely on the inner side of the bundle pack's outer wrapper and which contains data on the package contents. One special feature here relates to the production of the packaging material. The transponders are attached at precise positions on a continuous web of the packaging material—paper, film or laminate—in such a manner that each blank to be severed from the material web is assigned one transponder. The packaging material preferably comprises at least two layers of continuous webs, with the transponder being inserted between two layers in a position compatible with the package and in a concealed position between these layers when the packaging material is completed.

A further special feature is the embodiment of cigarette packs with a closure or revenue strip. According to the invention, this strip is provided with a transponder which, for one, records the tax-related data, and which in addition can store specific production data.

Another important topic is the identification of machine parts, especially those of packaging machines. The aim is to identify machine parts, assemblies, etc. with the help of transponders in such a way that, for one, their stockkeeping is thereby facilitated, and for another, as a means of ensuring correct assignment when exchanging machine parts, machine elements, assemblies etc. In order to ensure the latter, the invention provides for at least one electronic read unit to be installed in the packaging machine adjacent to one or more transponders of the appropriately localized machine parts, assemblies, etc.

BRIEF DESCRIPTION OF THE DRAWINGS

Further details and features of the invention are described in the following drawings based on exemplary embodiments which show.

DETAILED DESCRIPTION OF THE INVENTION

The drawings illustrate important examples of the use and application of transponders, i.e. data carriers operating on the principle of radiofrequency technology. Transponders can exhibit different shapes and dimensions, for example they may take the form of a label, sheet or disc, but can also be configured in the shape of a cylinder or rod. Information and data of all kinds can be stored on transponders, specifically by being transferred by means of an electronic write unit. The data can be recalled by correspondingly configured read units.

Figure 1:
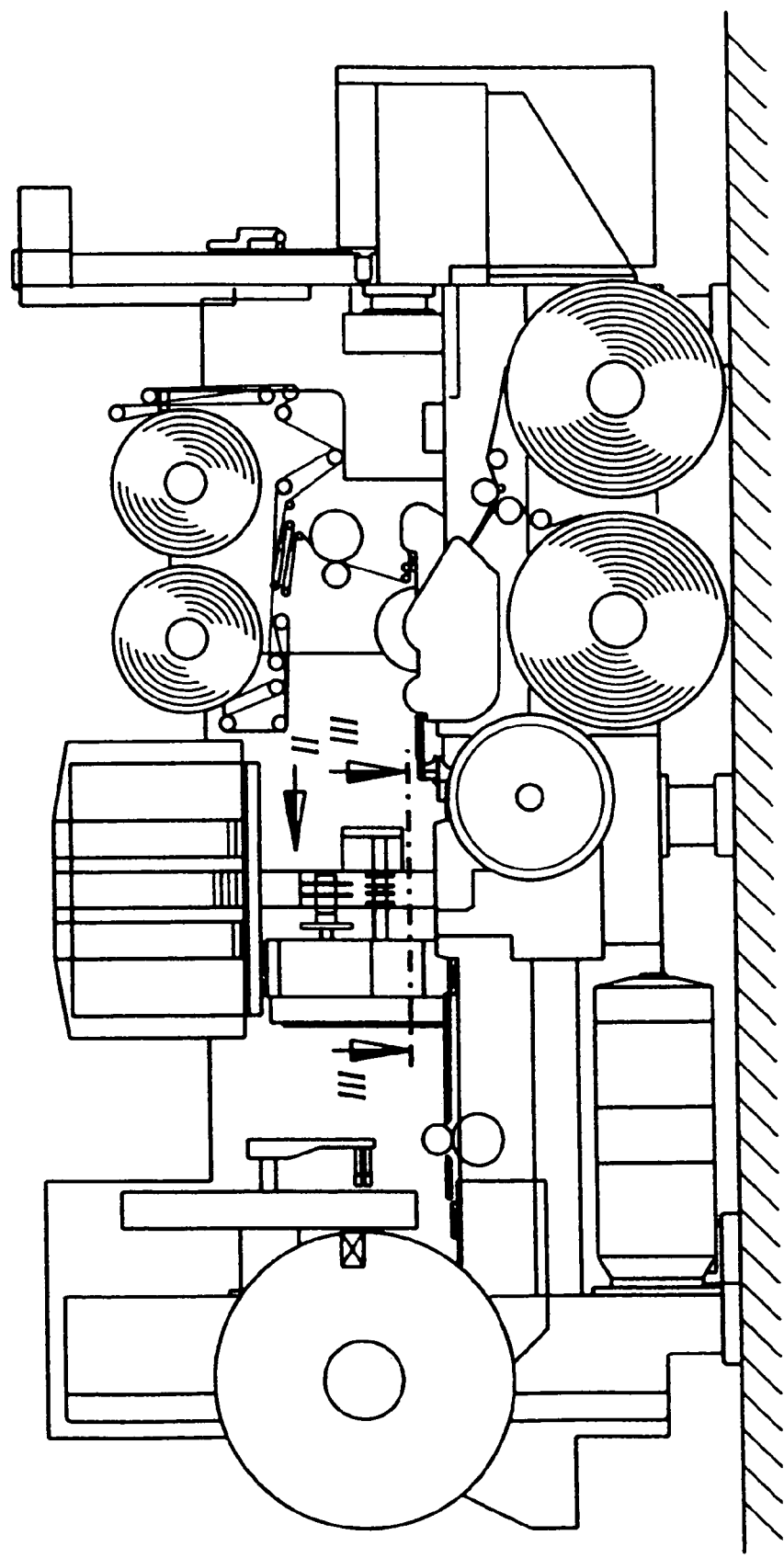
FIG. 1 a schematic side view of a packaging machine for the production of cigarette packs, FIG. 2 a schematic side view of an assembly of the packaging machine pursuant to FIG. 1, namely a blanks apparatus, in an enlarged scale, FIG. 3 a schematic plan view of a folding turret of a packaging machine, FIG. 4 sectional view of the folding turret of FIG. 3 along sectional plane III-III on an enlarged scale, FIG. 5 perspective view of a package, namely a cigarette carton, and read unit, FIG. 6 perspective view of a bulk package, namely a shipping case, containing a multiplicity of bundle packages (cartons) pursuant to FIG. 5, FIG. 7 schematic representation of the production of packaging material with transponders, in side view, FIG. 8 side view of the production of packs with transponders, FIG. 9 perspective view of a cigarette pack of the hinge-lid type, FIG. 10 a band unit, i.e. an apparatus for producing and applying revenue strips to a (cigarette) pack.

One special feature is the use of transponders in the identification of machine parts and machine elements. FIG. 1 shows a side view of a packaging machine for the production of hinge-lid cigarette packs, specifically those having rounded pack edges—round-corner hinge-lid packs. The machine comprises a plurality of assemblies. Shown as examples are a blanks apparatus (FIG. 2) and a folding turret (FIG. 3, FIG. 4).

Figure 2:
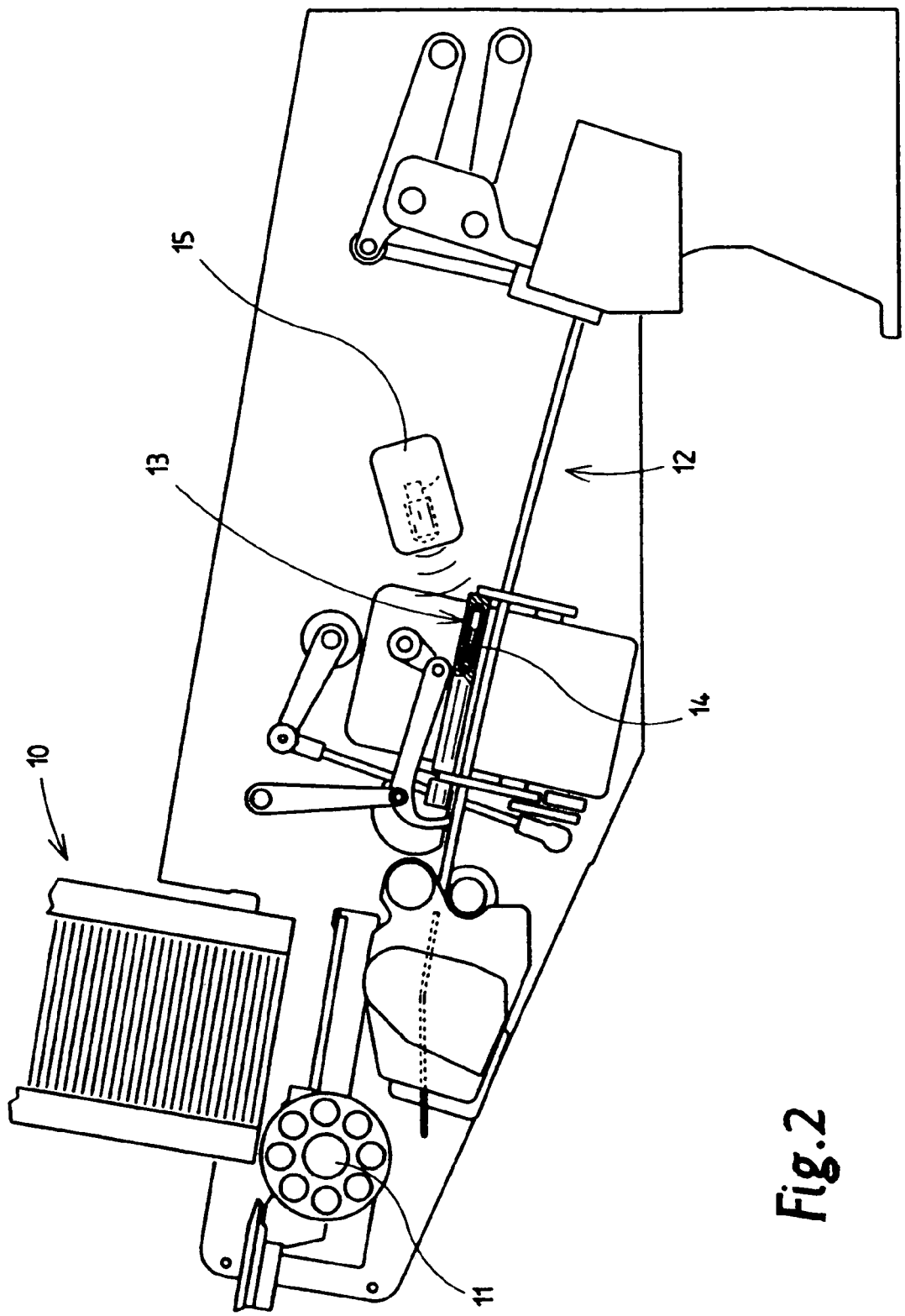

The blanks apparatus pursuant to FIG. 2, with known design, has a blanks magazine 10, from which blanks can be successively removed by a so-called dispenser roll 11. The blanks are fed to a blanks path 12, in the region of which various tools are deployed which execute folds or deformations of the blanks. In the production of round-corner packs, rounded pack edges are pre-formed, specifically by means of folding the side tabs of the blank with the help of form tools, namely, in the present case, by rounding rollers 13. The construction and operating method of this assembly is known from U.S. Pat. No. 4,708,704.

The apparatus pursuant to FIG. 2 is meant to be identified either as a whole or with respect to individual elements, thus making their precise assignment possible, especially with respect to the identification of their origin. To this end at least one appropriately programmed transponder 14 is attached to the blanks apparatus pursuant to FIG. 2. The special feature is that the transponder 14 is attached in a protected or hidden position, thus excluding the possibility of manipulation, namely that involving damage or alteration, as a result of unauthorized access. To this end, the transponder 14 is embedded in a machine element. In the shown exemplary embodiment a cylindrical or rod-shaped transponder is embedded in the rounding roller 13. The latter is made of pliable material through which radio frequency waves can pass undisturbed. In the case shown, the carrier of the transponder 14, i.e. the rounding roller 13, is made of plastic. The transponder 14 is embedded when the machine elements are formed. As an alternative, the transponder 14 can be inserted subsequently in an appropriate recess, which is then closed by a cover.

The data of the transponder 14 are checked in the machine. In the case of the blanks apparatus, the data relates to the assignment of the removable unit for the appropriate application. The data are recorded by a read unit 15. The read unit 15 is connected to a (central) evaluation unit for processing the collected data. In particular, an error signal is generated whenever a faulty machine part is identified on the basis of the recorded and evaluated data of the transponder 14. The reading unit 15 is positioned in the packaging machine, or in the region of the blanks apparatus in such a manner that it is aimed at its associated transponder 14 and arranged adjacent thereto.

Another important exemplary embodiment is shown in FIG. 3 and FIG. 4. A central constituent of a packaging machine is a folding turret 16. In the present case, it is configured such that a flat, plate-shaped carrier 17 can revolve about a vertical axis. Attached on the outer circumference of the carrier 17 are pockets 18, each of which can accommodate one blank or pack.

The folding turret 16, or its carrier 17, is an exchangeable assembly unit of the packaging machine. The carrier 17, attached at the top end of an upright shaft journal 19, can be removed by means of screws.

When the folding turret 16 or carrier 17 is exchanged, it is necessary to ensure that the replacement unit of the correct type is installed. To this end, the folding turret 16 has a (flat, disc-shaped) transponder 20 attached to the bottom side of the carrier 17. Also assigned to the transponder 20 here is a read unit 15. The latter is also attached in a stationary position below the folding turret 16 or carrier 17 such that the transponder 20 lies opposite the read unit 15 in at least one (mounted) position. The read unit 15 is also connected to the central evaluation unit.

One special feature is that the transponder 20 is not attached to the exterior of the machine element, namely the carrier 17, but is embedded in it instead. The carrier 17 has a molded or fashioned recess 21, into which a supporting element 22 with the embedded transponder 20 is inserted. The supporting body 22 can be made of plastic, but at least it should be made of a material neutral with respect to the technology of the transponders 20. The transponder 20 is protected and secured against unauthorized manipulation.

Figure 6:
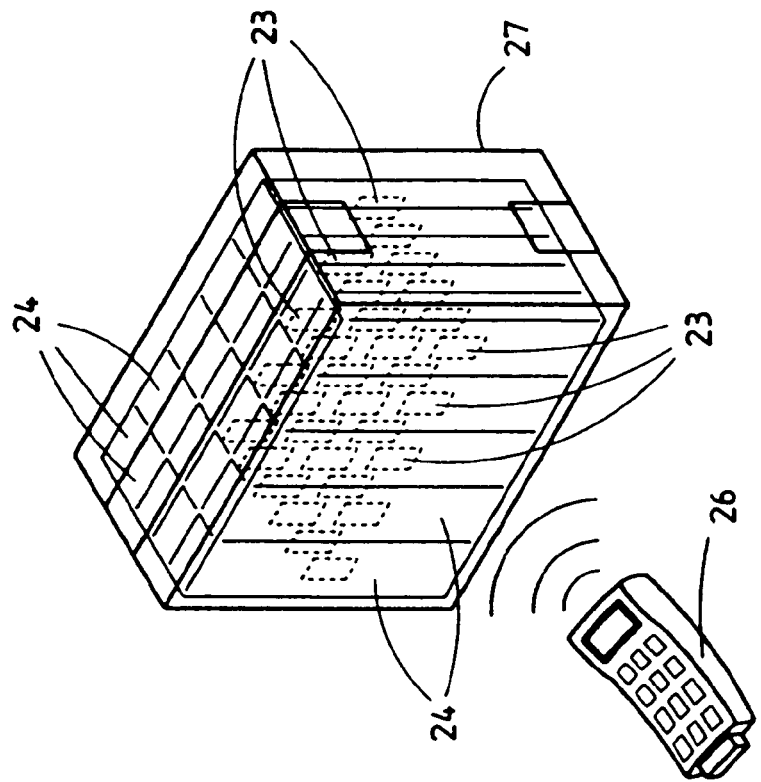
Figure 5:
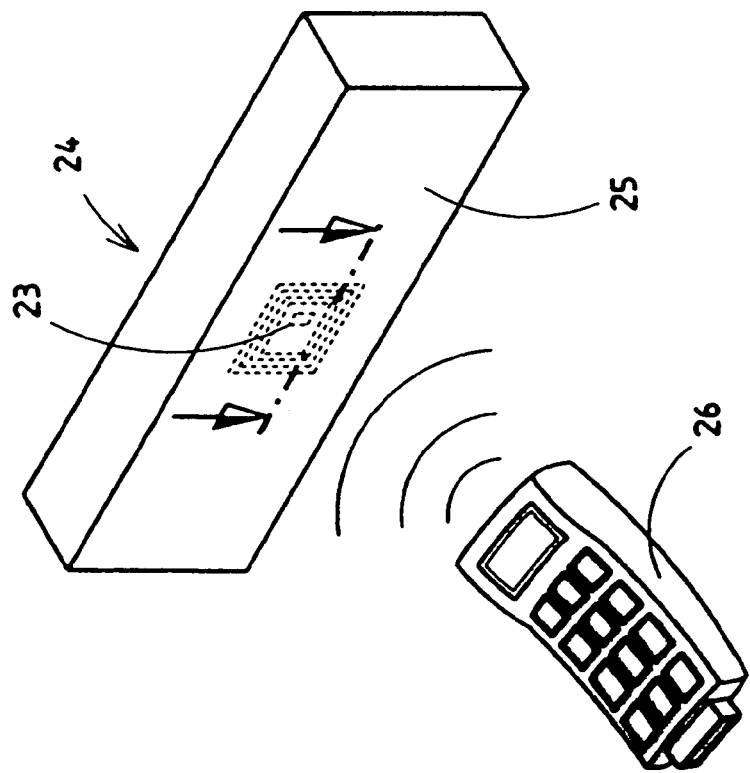

FIG. 5 and FIG. 6 show in particular applications of transponders 23 in conjunction with cigarette packages. The transponder is attached to a bundle pack 24—cigarette carton—for a group of (ten) cigarette packs. The bundle pack 24 has an outer wrapper to which the transponder 23 is attached on its inner side, specifically in the region of a large-surface package wall 25. The transponder 23 contains in particular data relating to the manufacture of the cigarettes and their packaging. A read unit 26 can be employed to read this data for control purposes.

A multiplicity of such bundle packs 24 are placed in a large container, namely a case 27, for shipping purposes. The read unit 26 is employed to determine whether the case 27 is completely filled with bundle packs 24. It is also possible, by scanning all transponders 23 of the bundle packs 24 in the case 27, to determine whether the case 27 is filled with bundle packs 24 of the same product.

Figure 7:
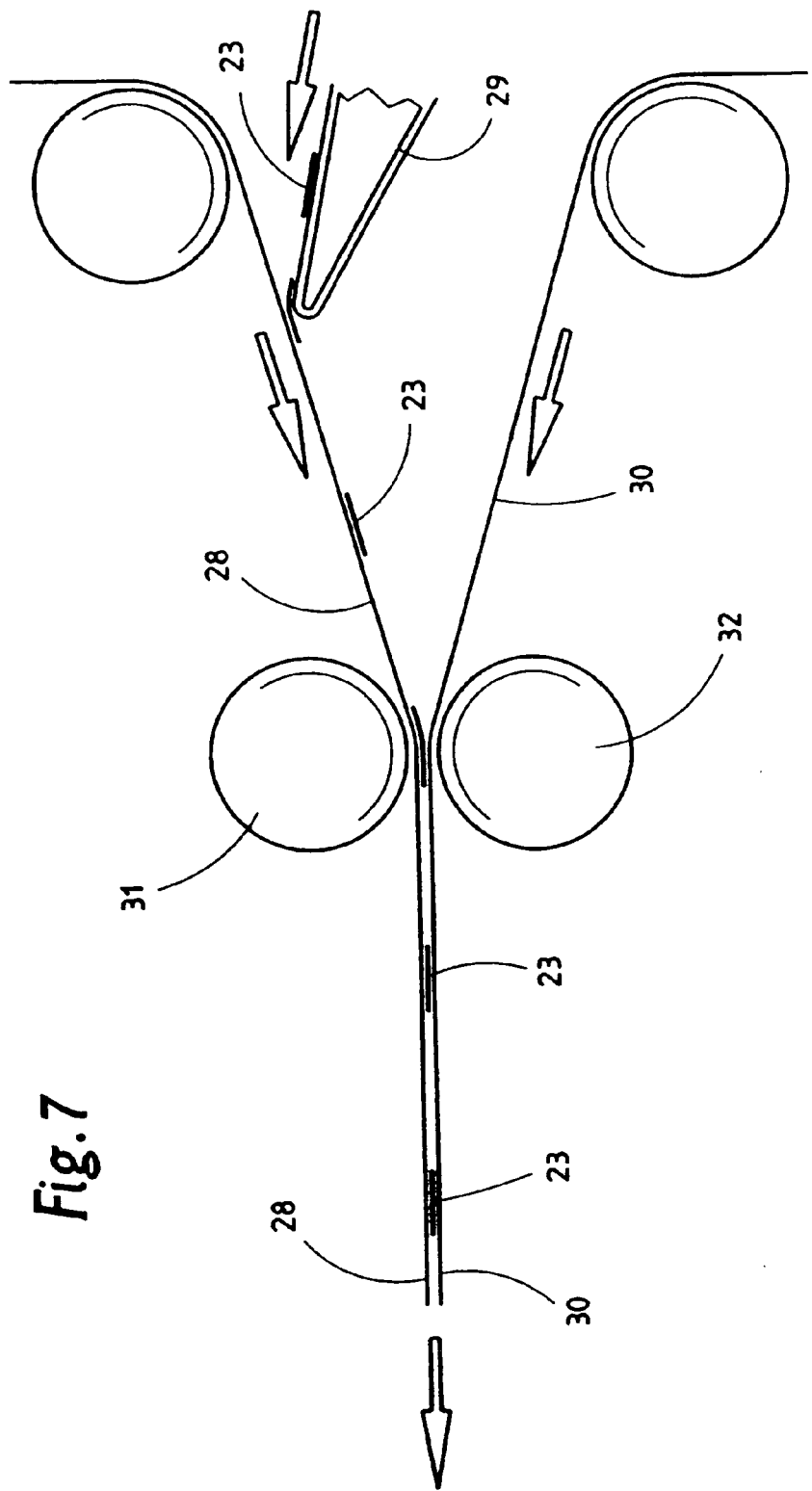

The industrial production of packs with a transponder 23 is conducted pursuant to FIG. 7 such that the transponders 23 are fed to a continuous material web 28 and attached to same at precise positions. The transponders 23 are positioned such that they assume the desired location on the blank for each package during the subsequent severing of blanks, for example in the production of bundle packs 24 pursuant to FIG. 5. The transponders 23 are fed by means of a special conveyor 29 to the material web 28 and attached to it, for example by adhesive bonding.

A further special feature of FIG. 7 is that the transponders 23 lie between the material web 28 and a further material web 30, i.e. are embedded between these webs 28, 30. The two material webs 28, 30 are directed in a converging or funnel-shaped manner by the appropriately arranged deflection rollers. The transponders 23 are attached to the material web 28 while it is still separately directed. Afterwards, the material webs 28, 30 are joined between pressure-exerting rollers 31, 32 and connected to each other, thus embedding the transponders 23. The multi-layer material web so formed is fed to a blanks apparatus for severing the blanks for the packages such that each blank has at least one transponder 23 in the desired position.

Figure 8:
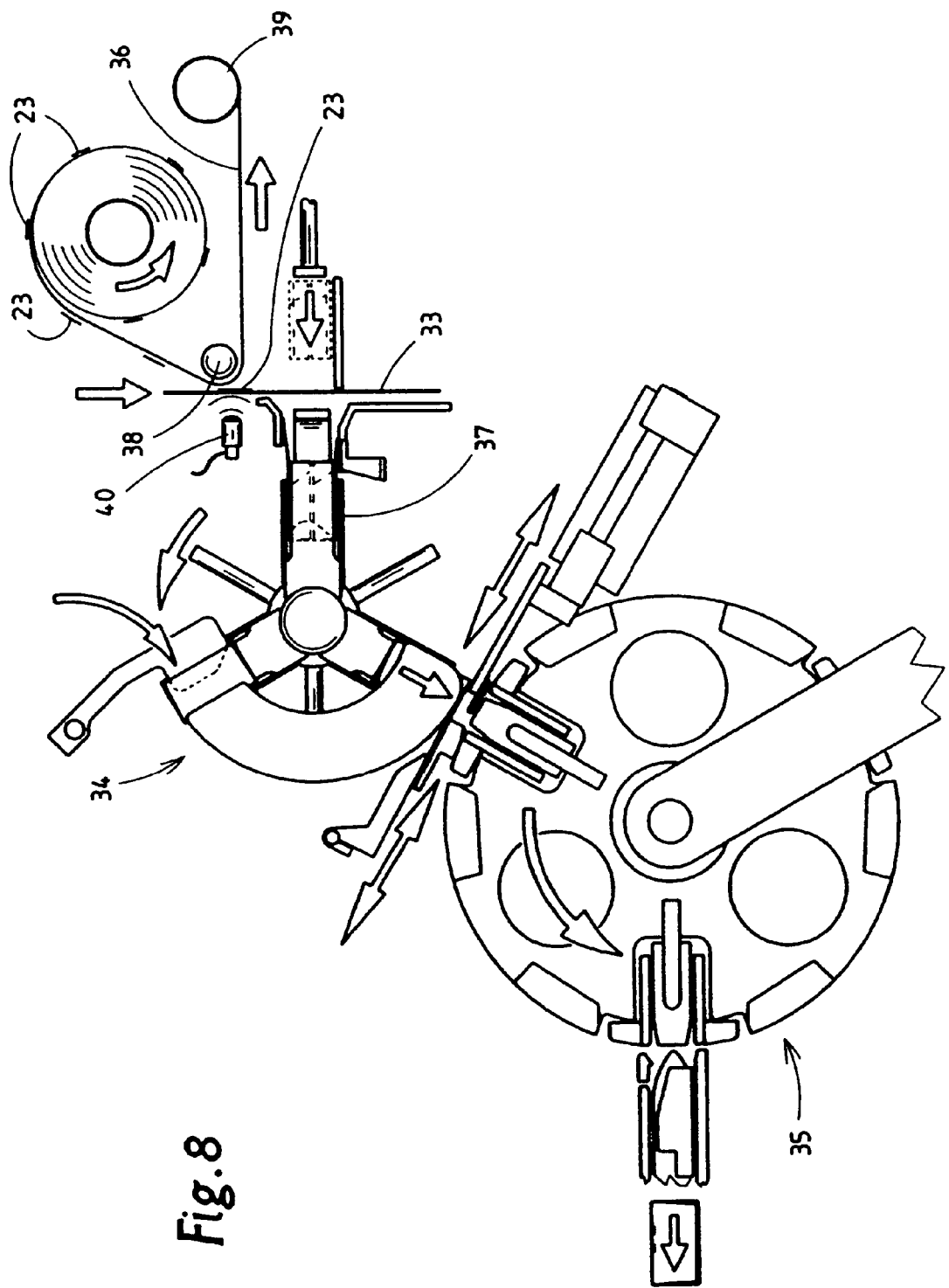

FIG. 8 shows another special feature in the use of transponders 23. During the finishing of packages, in particular of bundle packs 24 for cigarettes, and in conjunction with the application of the outer wrapper, they are directly attached to a blank 33 for the outer wrapper. The manufacture of the bundle pack 24 is illustrated here schematically, showing a bundle packer having two folding turrets 34, 35. In this case, the bundle pack 24 exiting the second folding turret 35 has the transponder 23 on its top side, more precisely on the inner side of the top pack wall 25.

The transponders 23 are attached to a carrier web 36 for their supply and retrieval. Here the transponders 23 are spaced at a distance which ensures the technical requirements of the production process that the transponders 23 are capable of being fed to the blank 33 which is held ready at the entry side of the folding turret 34. The blanks 33—severed from a material web—are positioned in each case in an upright plane in front of a pocket 37 of the folding turret 34. The process of wrapping a cigarette group proceeds in the usual manner, namely by having the U-shaped wrapping of the pack group inserted into the pocket 37 and taking the blank 33 along with it. In the process, the transponder 23 and the corresponding part of the blank 33 are positioned at the top side of the pack group.

The carrier web 36 with the transponders 23 is prepared in a special manner. The transponders 23 are detachably fixed to the carrier web 36 by adhesive means. In the region of a deflection, namely in the region of a deflector roll 38 of small diameter, the transponder 23 is transferred to the blank 33, specifically by being pressed against the latter while simultaneously being detached from the carrier web 36. Following the deflector roll 38 the carrier web leads to a take-up roll 39, which winds up the carrier web 36 for reuse.

In the shown example, a write unit 40, i.e. an electronic device for transferring the respective data to the transponder 23, is arranged in the region of the non-folded blank 33, namely opposite the deflector roll 38. The data used for the purpose of identifying the package contents are therefore recorded immediately prior to the start of the folding process.

FIG. 9 and FIG. 10 relate to the design and production of a special type of cigarette pack 41, namely a soft-cup pack. It is designed such that a U-shaped band 42 is arranged transversely across the end surface of the pack. This band 42 serves as a closure means for the cigarette pack, but is primarily intended as a revenue strip. The special feature here is that a transponder 43 is attached to the band 42, preferably on its inner side The transponder 43 can contain data relating to any required fiscal data, but can also contain data concerning the production of the cigarettes and the pack.

FIG. 10 shows a band apparatus whose configuration corresponds essentially to U.S. Pat. No. 5,972,153. The bands 42 are severed from a corresponding pre-printed web 44 and fed by means of a suction belt 45 to the cigarette packs 41 as conveyed by a folding turret. A transverse severing cut prepares the web 44 for the finished bands 42. To this end, one side of the web 44 is printed with fields for the formation of the bands 42. Each of these fields is assigned a transponder 43 on the reverse side of the web 44. The bands 42 fed to the cigarette packs therefore already have the transponders 43 attached to their inner side.

The transponders 43 are activated expediently, i.e. provided with the necessary data, before the bands 42 are attached to the cigarette pack 41. In the present example, an electronic write unit 46 is arranged in the region of the web 44 and transfers the appropriate required data to the transponders 43 as the web 44 is moved past the write unit 46. As a alternative, provision can be made so that the data are transferred to the transponder 43 after the band 42 has been attached to the pack. The special feature described here is also applicable analogously when the bands are prepared separately and made available as stacks or taken from a band magazine assigned to the packaging machine.

| List of designations | |
|---|---|
| 10 | blanks magazine |
| 11 | dispenser roll |
| 12 | blanks path |
| 13 | rounding roller |
| 14 | transponder |
| 15 | read unit |
| 16 | folding turret |
| 17 | carrier |
| 18 | pocket |
| 19 | shaft journal |
| 20 | transponder |
| 21 | recess |
| 22 | supporting body |
| 23 | transponder |
| 24 | bundle pack |
| 25 | pack wall |
| 26 | read unit |
| 27 | case |
| 28 | material web |
| 29 | conveyor |
| 30 | material web |
| 31 | pressure-exerting roller |
| 32 | pressure-exerting roller |
| 33 | blank |
| 34 | folding turret |
| 35 | folding turret |
| 36 | carrier web |
| 37 | pocket |
| 38 | deflector roll |
| 39 | take-up roll |
| 40 | write unit |
| 41 | cigarette pack |
| 42 | band |
| 43 | transponder |
| 44 | web |
| 45 | suction belt |
| 46 | write unit |

The invention claimed is:

1. A packaging machine, for the production of cigarette packs (41), with a folding turret (16) that has pockets (18) for accommodating blanks or packs on a carrier (17), characterized by the following features:
   a) the folding turret (16) exchangeably arranged in the packaging machine and is replaceable with other folding turrets (16) having a different configuration with respect to size and/or design of the pockets (18),
   b) the folding turret (16) has a flat, plate-shaped carrier (17) for the pockets (18),
   c) the carrier (17) is detachably attached at a top end of an upright shaft journal by screws,
   d) attached to each of the folding turrets (16) is a transponder (20) which stores data relating to the respective folding turret (16), namely with respect to the size and/or the design of the pockets (18),
   e) the transponder (20) is arranged at a bottom side of the carrier (17),
   f) the transponder (20) is embedded in a recess (21) in a wall of the carrier (17),
   g) in the packaging machine, an electronic read unit (15) is arranged in a stationary position and directed toward the transponder (20) of the respective folding turret (16) mounted in the packaging machine for the purpose of reading the stored data,
   h) the read unit (15) is arranged below the carrier (17) in the region of the transponder (20), and
   i) the read unit (15) is connected to a central evaluation unit in which the read data of the transponder (20) is compared with stored data of the type of cigarette packs (41) to be produced in each case.

2. The packaging machine according to claim 1, characterized by the following features:
   a) the transponder 20 is embedded within a supporting body (22), made of a material neutral with respect to the technology of the transponder (20), specifically made of plastic, and
   b) the supporting body (22) with the transponder (20) is inserted in the recess (21) of the folding turret (16).

3. The packaging machine according to claim 1, characterized in that, for the production of cigarette packs with rounded pack edges, an assembly for pre-shaping of rounded edges of the blanks is arranged in a region of a blanks path (12) leading to the folding turret (16), said assembly comprising rounding rollers (13), with a second transponder (14) being embedded in the rounding rollers, and a stationary read unit (15) being directed at the second transponder (14).

4. The packaging machine according to claim 3, wherein said second transponder is an RF transponder.

5. The packaging machine according to claim 1, wherein said first transponder is an RF transponder.

6. The packaging machine according to claim 5, characterized in that, for the production of cigarette packs with rounded pack edges, an assembly for pre-shaping of rounded edges of the blanks is arranged in a region of a blanks path (12) leading to the folding turret (16), said assembly comprising rounding rollers (13), with a second transponder (14) being embedded in the rounding rollers and a stationary read unit (15) being directed at the second transponder (14).

* * * * *